(12) United States Patent
Stasnick et al.

(10) Patent No.: US 6,397,264 B1
(45) Date of Patent: May 28, 2002

(54) MULTI-BROWSER CLIENT ARCHITECTURE FOR MANAGING MULTIPLE APPLICATIONS HAVING A HISTORY LIST

(75) Inventors: Steven L. Stasnick, Mountain View; David Lundberg, Dublin, both of CA (US)

(73) Assignee: rStar Corporation

( * ) Notice: Subject to any disclaimer, the term of this patent is extended or adjusted under 35 U.S.C. 154(b) by 0 days.

(21) Appl. No.: 09/431,011

(22) Filed: Nov. 1, 1999

(51) Int. Cl.[7] .......................... G06F 15/163; G06F 3/14
(52) U.S. Cl. ...................... 709/328; 345/738; 345/739; 345/783; 707/501.1; 707/513
(58) Field of Search ................................ 709/312, 313, 709/318, 223, 328, 329; 345/333, 335, 346, 739, 783, 738, 760, 854; 707/501.1, 513

(56) References Cited

U.S. PATENT DOCUMENTS

| | | | |
|---|---|---|---|
| 4,677,434 A | 6/1987 | Fascenda | 380/23 |
| 4,745,559 A | 5/1988 | Willis et al. | 364/514 |
| 5,105,184 A | 4/1992 | Pirani et al. | 340/721 |
| 5,131,020 A | 7/1992 | Liebesny et al. | 379/59 |
| 5,321,750 A | 6/1994 | Nadan | 380/20 |
| 5,327,554 A | 7/1994 | Palazzi, III et al. | 395/600 |
| 5,347,632 A | 9/1994 | Filepp et al. | 395/200 |
| 5,379,421 A | 1/1995 | Palazzi, III et al. | 395/600 |
| 5,404,505 A | 4/1995 | Levinson | 395/600 |
| 5,412,776 A * | 5/1995 | Bloomfield et al. | 345/783 |
| 5,465,401 A | 11/1995 | Thompson | 455/89 |
| 5,512,935 A | 4/1996 | Majeti et al. | 348/9 |
| 5,524,146 A | 6/1996 | Morrisey et al. | 379/207 |
| 5,614,940 A | 3/1997 | Cobbley et al. | 348/7 |
| 5,748,190 A | 5/1998 | Kjorsvik | 345/329 |
| 5,819,284 A | 10/1998 | Farber et al. | 707/104 |
| 5,905,492 A * | 5/1999 | Straub et al. | 345/333 |
| 5,922,054 A * | 7/1999 | Bibayan | 709/328 |
| 5,959,623 A * | 9/1999 | Van Hoff et al. | 345/333 |
| 6,049,812 A * | 4/2000 | Bertram et al. | 707/516 |
| 6,061,695 A * | 5/2000 | Slivka et al. | 707/513 |
| 6,160,552 A * | 12/2000 | Wilsher et al. | 345/739 |
| 6,043,816 A1 * | 6/2001 | Williams et al. | 345/783 |
| 6,243,091 B1 * | 6/2001 | Berstis | 345/854 |

OTHER PUBLICATIONS

Brown, Using Netscape 2, Second Edition, Que Corporation, 1995, pp. 158–163, 982, 1995.*

* cited by examiner

Primary Examiner—Glenton B. Burgess
Assistant Examiner—Bradley Edelman
(74) Attorney, Agent, or Firm—Blakely Sokoloff Taylor & Zafman LLP

(57) ABSTRACT

A method and apparatus for implementing a multiple-browser architecture is described. In one embodiment, the apparatus launches an application program in response to a trigger event. In addition, the apparatus maintains a history list corresponding to the launched application and allocates an application entity within an existing application window on the computer system. Further, the apparatus displays content data corresponding to the application program within the application window.

35 Claims, 6 Drawing Sheets

MULTI-BROWSER CLIENT ARCHITECTURE FOR MANAGING MULTIPLE APPLICATIONS HAVING A HISTORY LIST

FIELD OF THE INVENTION

The present invention relates to networked terminals that provide access to network resources. More particularly, this invention relates to a multiple-browser, multi-application client architecture.

BACKGROUND OF THE INVENTION

Efficient techniques for accessing and utilizing information are important considerations for manufacturers, designers and individual users of modern electronic information systems. Sources of such electronically available information include various types of electronic networks, such as the Internet, which are typically accessible through a compatible computer device or other similar electronic system.

Typical web browser programs (browser) run on the computer desktop as one of many applications. Control of the browser application window layout and management is performed by the underlying computer operating system (O/S). When additional functions, such as e-mail, are added to the browser, the additional functions are typically managed by the O/S as another window on the desktop.

Moving between the browser and application windows, such as word processing, is awkward as a new window is created for each and every application running on the system and interacts independently with the O/S. Newly created windows are easily lost or obscured by other windows. In addition, important features or information within underlying applications are not easily found. In addition, other browser based functions such as e-mail, search, chat, and messaging appear in the browser as another web page causing awkward navigation between the functions. The foregoing leads to a loss of application state and context, disrupting the user's workflow.

SUMMARY OF THE INVENTION

A method and apparatus for implementing a multiple-browser architecture is described. In one embodiment, the apparatus launches an application program in response to a trigger event. In addition, the apparatus maintains a history list corresponding to the launched application and allocates an application entity within an existing application window on the computer system. Further, the apparatus displays content data corresponding to the application program within the application window.

BRIEF DESCRIPTION OF THE DRAWINGS

The present invention is illustrated by way of example, and not by way of limitation in the figures of the accompanying drawings, in which like references indicate similar elements and in which.

DETAILED DESCRIPTION

Figure 1:
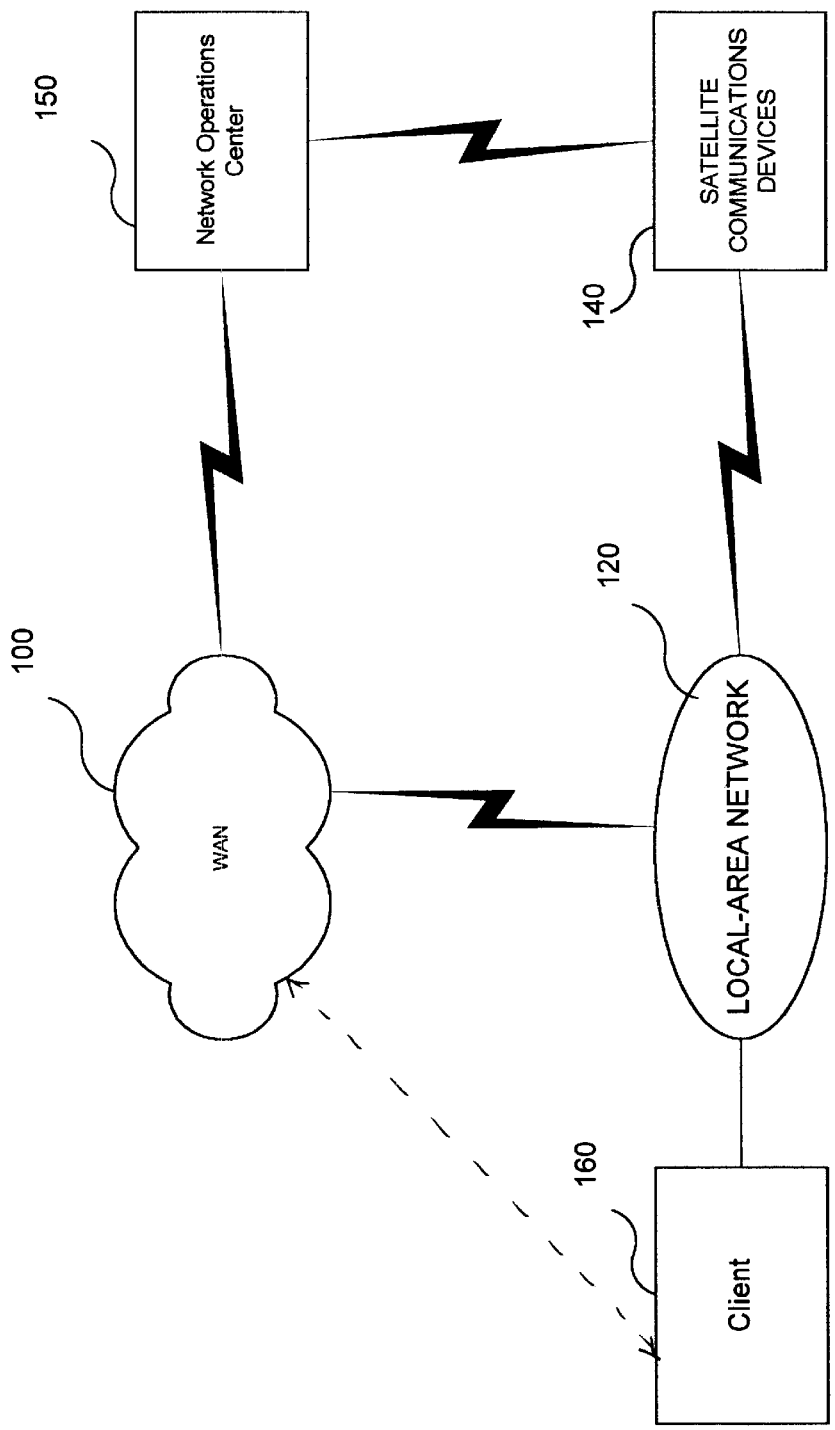
FIG. 1 is a block diagram of one embodiment for a network configuration of a multiple-browser client architecture.

A method and apparatus for implementing a multiple-browser architecture is described. In one embodiment, an integrated desktop management system, optimized for multiple-browser, multi-application workflow is described. Key Internet and desktop functions such as e-mail, searching, chat, messaging, and the like exist within their own independently managed windows. Each function maintains its own state and navigation history. Navigational "click-throughs" from these functions to other web locations are automatically dispatched by a multiple-browser application to other browser window areas, allowing the user to preserve his or her place within each application. Third-party productivity applications, such as word processing, graphic programs and the like, may be integrated into and managed by the multiple-browser application to provide for efficient data exchange and context switching. All newly generated windows are managed by the multiple-browser application and are displayed within a content window on the display screen. This prevents critical interface functions from being obscured by the content window.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. Although the description that follows describes the embodiments in terms of a web site, the embodiments are not so limited and may be practiced with any displayable information.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, throughout the following discussion, terms such as "processing" or "computing" or "calculating" or "determining"

or "displaying" or the like refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The present invention allows a user of a networked device, such as a computer system or a set-top box, to have access privileges based on user identity and the network device (e.g., terminal) used to access the network. In one embodiment, authorized users of the network have a user identity (e.g., login name and password) that identifies the user. Each authorized user of the network has a set of user privileges. The user privileges identify local resources (e.g., applications, media files) and network resources (e.g., World Wide Web pages, communications protocols, content channels) that are available to the user. In one embodiment, user access to particular applications, whether local or remote, are determined based on whether the user is current in access fees (i.e., billing status), if the resource is otherwise available to the user and the terminal being used.

In one embodiment, each device connected to the network has an associated set of device privileges that identify local resources and network resources that are provided by the device. When an authorized user of the network logs in at a terminal, that user is provided with session privileges that are the intersection of the individual user privileges and the device privileges of the device on which the user is logged in. Thus, a consistent, but not necessarily constant, set of access privileges can be provided to users regardless of the device used to access the individual resources. In other words, the user has access to all resources that the user has rights to, so long as those resources are available (based both on technical availability and usage policy) to the specific terminal being used regardless of the terminal being used and the location of the terminal.

FIG. 1 is a block diagram of one embodiment for a network configuration of a multiple-browser client architecture. The configuration of FIG. 1 is described in terms of both land-based communications and satellite communications; however, the manner of communication is not central to the present invention. Therefore, the present invention is applicable to any interconnection of devices that provide access to local and remote resources.

Referring to FIG. 1, wide area network (WAN) 100 provides an interconnection between local-area network 120, client 160, and network operations center 150. In alternate embodiments, any number of local-area networks 120, clients 160, and network operations center 150 may be connected to WAN 100. In one embodiment, WAN 100 is the Internet; however, any network or other interconnection may be used to implement wide area network 100.

In one embodiment, client 160 may be an individual terminal that provides access to network resources as well as local resources for a network user. In one embodiment, client 160 is a personal computer connected to wide area network 100 via a modem, a wireless connection, etc. In an alternate embodiment, client 160 may be a set-top box which may use a cable modem to access the WAN 100. In another embodiment, client 160 may be a "dumb" terminal, or a thin client device such as the ThinSTAR™ available from Network Computing Devices, Inc. of Mountain View, Calif.

Local-area network 120 provides an interconnection of devices at a local level. For example, local-area network 120 may interconnect multiple computers, printers, and other devices within one or more buildings. Local-area network 120 may be coupled to wide area network 100 or to satellite communications device 140. Local-area network 120 provides an interconnection of devices. In one embodiment, local-area network 120 contains a proxy server (not shown) for duplicating operations of network operations center 150.

Network operations center 150 is coupled to wide area network 100 and provides access to network resources for client 160 and local-area network 120. Network communications center 150 communicates via wide area network 100 with either client 160 or local-area network 120. Network operations center 150 and local-area network 120 may communicate via wide area network 100 and/or satellite communications devices 140.

In one embodiment, network operations center 150 includes multiple servers (not shown in FIG. 1) that provide access to network and other resources. For example, network operations center 150 may include a Web proxy server that provides access to the World Wide Web (WWW, or the Web) for devices of local-area network 120, and client 160. Network operations center 150 may also include other devices, such as, for example, a middleware server or a file server, that provide information to devices coupled to network operations center 150.

In one embodiment, information is communicated between network operations center 150 and local-area network 120 via satellite communications devices 140. Satellite communications devices 140 includes the necessary components to provide communications between network operations center 150 and local-area network 120. In one embodiment, satellite communications may be accomplished using Transmission Control Protocol/Internet Protocol (TCP/IP) embedded within a Digital Video Broadcast (DVB) stream. In alternate embodiments, any well-known communication protocol can be used. In one embodiment, satellite communications are bi-directional. Alternatively, if satellite communications are unidirectional, wide area network 100 may be used to provide a hybrid asymmetrical bi-directional communications system, such as the SkySurfer™ platform available from Gilat Satellite Networks, Inc. of McLean, Va.

Figure 2:
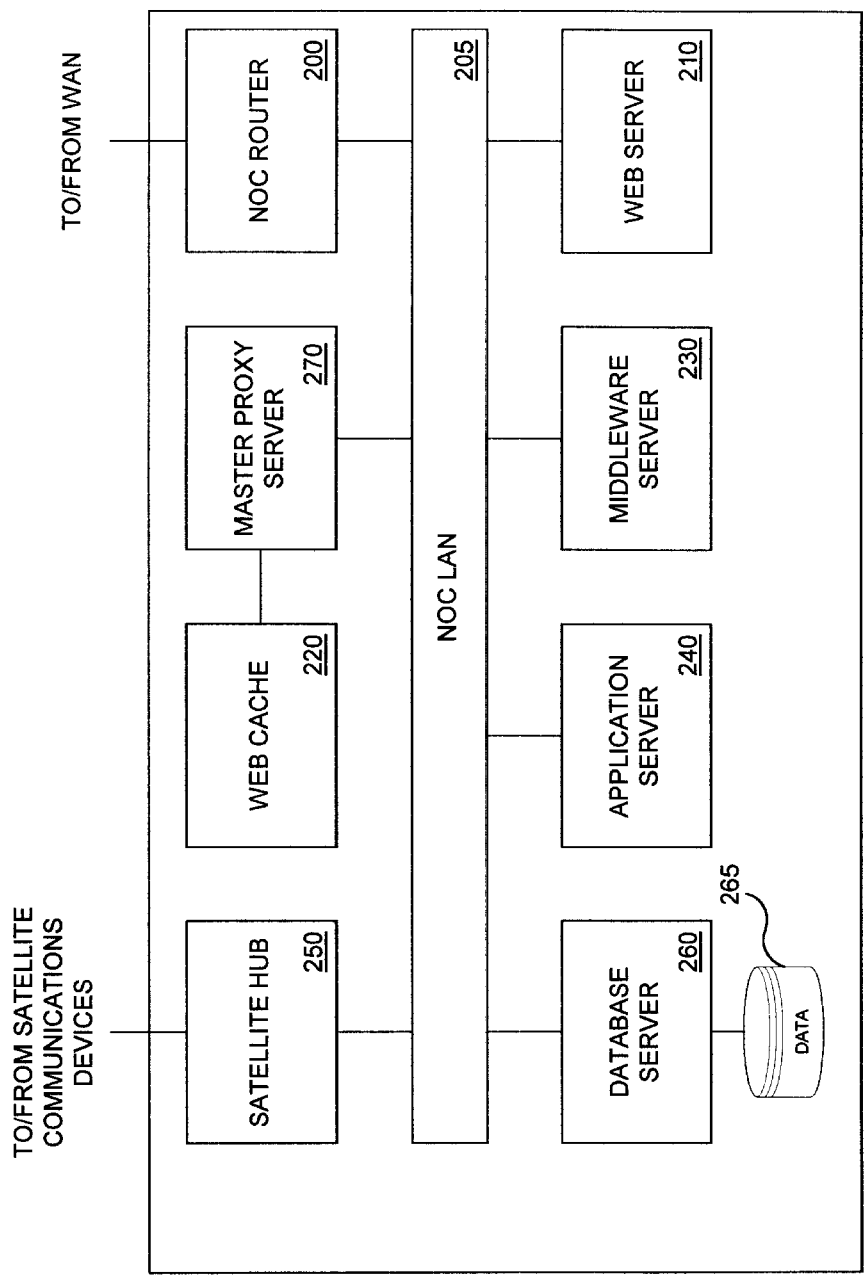
FIG. 2 is a block diagram of one embodiment for a network operations center of FIG. 1.

FIG. 2 is a block diagram of one embodiment for a network operations center 150. With respect to description of FIG. 2, wide area network 100 and satellite communications devices 140 are implemented as described above in FIG. 1. Notwithstanding being described as including certain types of servers and other devices, network operations center 150 may include different or additional components as well as multiple components, for example, multiple Web servers. Each server may be composed of one or more software and/or hardware components.

Network operations center (NOC) 150 provides resources to local-area networks and individual clients (not shown). In addition, in one embodiment, NOC 150 may provide a gateway to a larger network such as, for example, the Internet. Thus, network operations center 150 may be used to provide a controlled set of resources while being part of a larger network. This is particularly advantageous in situations where users of the local-area networks are somewhat homogenous. For example, students in similar grade levels, professionals, and other groups.

Additional uses and details of network operations center configuration can be found in U.S. patent application Ser. No. 09/216,016; entitled "OPTIMIZING BANDWIDTH CONSUMPTION FOR DOCUMENT DISTRIBUTION OVER A MULTICAST ENABLED WIDE AREA NETWORK" and U.S. patent application Ser. No. 09/216,018, entitled "A METHOD AND APPARATUS FOR SUPPORTING A MULTICAST RESPONSE TO A UNICAST REQUEST FOR DATA," both of which are assigned to the corporate assignee of the present invention.

Referring again to FIG. 2, NOC router 200 is coupled to NOC LAN 205 and provides routing and firewall functionality for the servers and other components of network operations center 150. NOC router 200 may be implemented in any manner known in the art. In one embodiment, database server 260 is coupled to NOC LAN 205. Database server 260 may be used, for example, to store information about authorized users of associated local-area networks, or to store information about resources that are available on each terminal connected to the network. Database server 260 may also be used to store statistics about network usage, advertisements to be downloaded to devices of the local-area networks, etc. Data 265 represents data stored by database server 260 and may be one or more physical devices.

Master proxy server 270 is also coupled to NOC LAN 205 to provide World Wide Web resources to devices of the connected local-area network(s) or individual clients. In one embodiment, web server 210 is a Hypertext Markup Language (HTML) and/or Secure Sockets Layer (SSL) server. In alternate embodiments, Web server 210 may be any other suitable server. Web cache 220 is used to store Web resources (e.g., Web pages) that are most often accessed, most recently accessed, etc. In one embodiment, Web cache 220 stores a predetermined set of Web resources that are provided to the local-area networks. For example, in a school network environment, the cached Web resources may be a pre-approved set of Web pages. In one embodiment, all or a portion of the contents of Web cache 220 are replicated on local networks.

Middleware server 230 manages database applications in network operations center 150. For example, middleware server 230 may determine which users have access to Web server 210. By querying the user database, middleware server 230 acts as an interface between clients and servers as well as between servers. Alternatively, each client and server may act as its own middleware device by interfacing with the database servers on their own behalf though existing database interfacing technologies such as the Common Object Request Broker Architecture (CORBA) as defined by Object Management Group, Inc. of Framingham, Mass. or COM+ available from Microsoft Corporation of Richmond, Wash.

Application server 240 provides applications programs to devices coupled to network operations center 150. For example, application server 240 may provide HTML-formatted e-mail services to one or more devices. Application server 240 may also run and manage run-time applications on clients 160 connected local-area networks.

Figure 3:
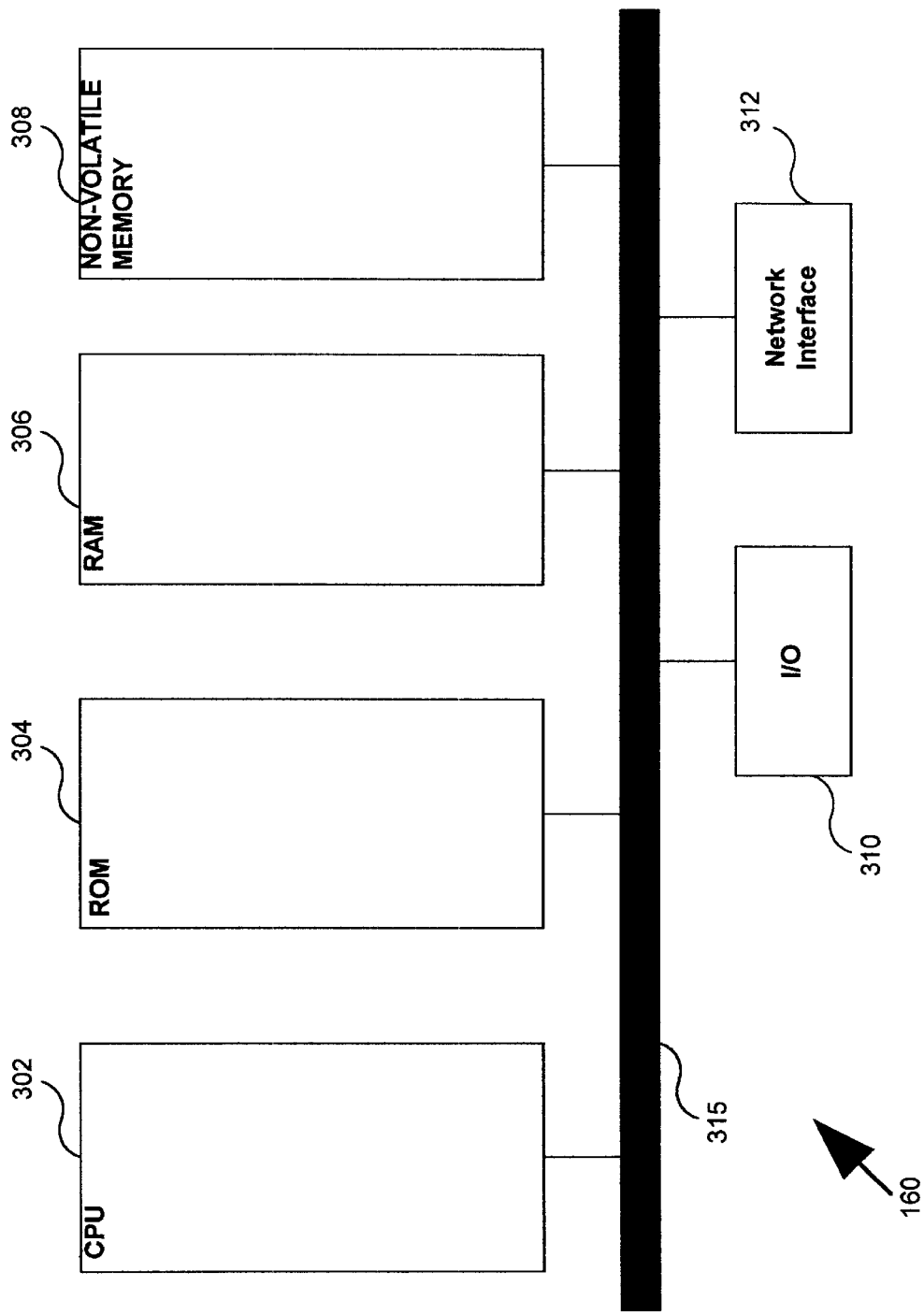
FIG. 3 is a block diagram of one embodiment for an architecture of a client.

FIG. 3 is a block diagram of one embodiment for an architecture of a client 160. Referring to FIG. 3, CPU 302 is coupled via a bus 315 to a variety of memory structures and input/output 310. The memory structures may include read only memory (ROM) 304, random access memory (RAM) 306, and/or non-volatile memory 308. In one embodiment, CPU 302 is also coupled via bus 315 to a network interface 312. Network interface 312 is used to communicate between client 160 and network operations center 150 and a variety of other clients 160. Network interface 312 is coupled to the wide area network 100 or to local-area network 120 by any of a variety of means such as, for example, a telephone connection via modem, a DSL line, or the like.

Figure 4:
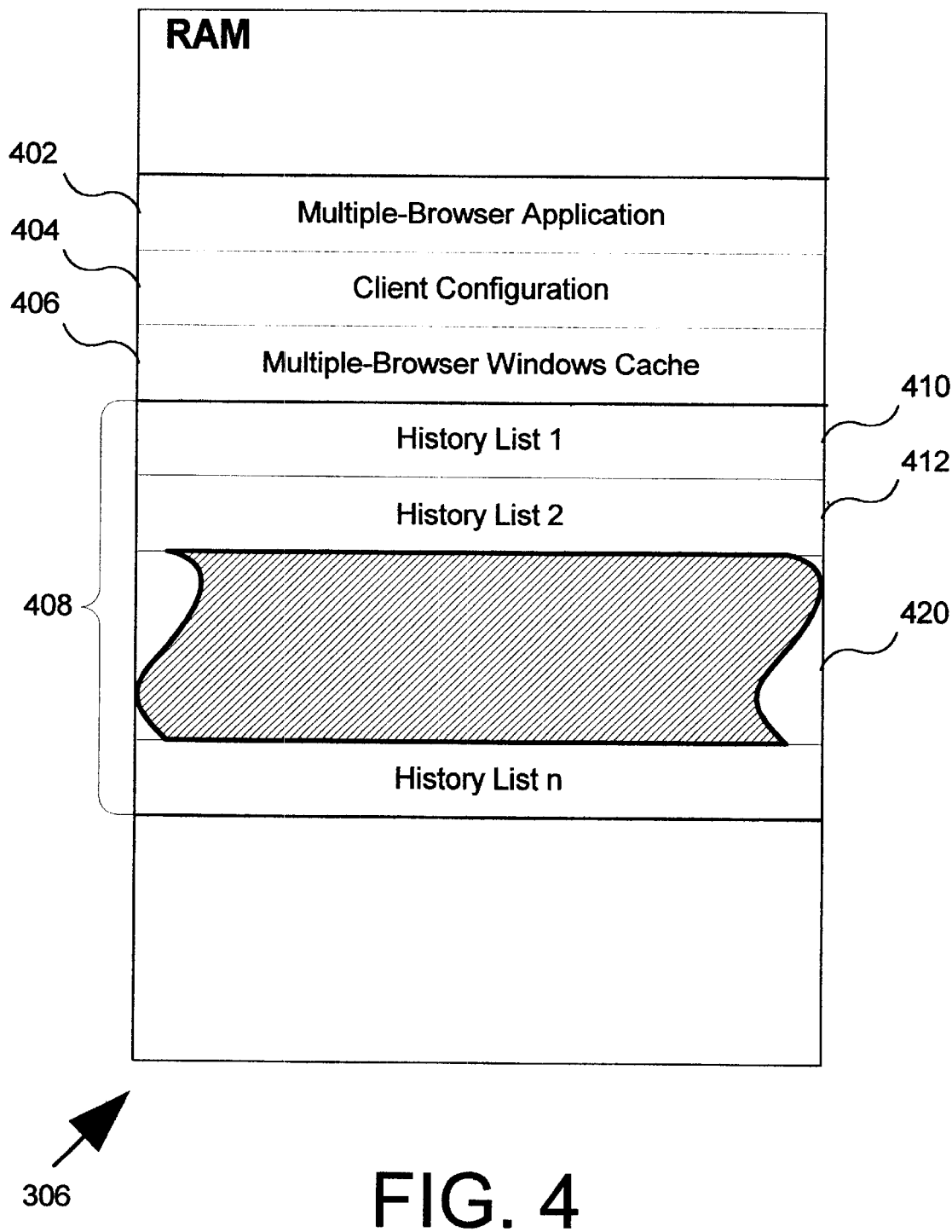
FIG. 4 is a block diagram of one embodiment for a random accesses memory of FIG. 3.

FIG. 4 is a block diagram of one embodiment for random access memory (RAM) 306. Referring to FIG. 4, RAM 306 contains multiple-browser application 402, client configuration 404, multiple-browser windows cache 406, and history list 408. In one embodiment, history list 408 contains history list 1 (410) through history list n (420). Multiple-browser application 402 communicates with network operations center 150 or with a proxy server maintained within local-area network 120 to manage the multiple browsers and applications accessed by the user. All navigation between windows applications and web applications is controlled by multiple-browser application 402. Client configuration 404 contains information to allow a user to sign-on to the system and to configure client 160. Client configuration 404 may contain user identification and/or passwords for sign-on and a configuration profile for specifically allowing access to various applications and web pages maintained on client 160, network operations center 150, and/or local-area network 120.

Multiple-browser windows cache 406 contains a number of content windows accessed by the user. As the user navigates within the system, various areas of the system are opened and displayed in specific windows on the desktop. The content of the window accessed or displayed by the system is maintained in the cache 406. For example, web pages accessed through a web browser program are opened within a browser window. Each web page content is cached in multiple-browser windows cache 406. In one embodiment, multiple-browser application 402 may open application, media, content, browser, and other windows and save the content of the pages accessed for each of these types of windows in multiple-browser windows cache 406. In one embodiment, the content for each window may be maintained in separate areas within the cache multiple-browser windows cache 406. In an alternate embodiment, individual caches may be maintained for the individual windows.

A history list 408 is maintained for each of the windows supported by the client configuration 404. In one embodiment, each history list 408 may contain an entry indicating the page of information displayed, the window it came from, and the location of the content in multiple-browser windows cache 406. In an alternate embodiment, any suitable information may be maintained. In one embodiment, a history list 408 may be maintained for each window type stored in multiple-browser windows cache 406. In addition, a separate history list 408 may be maintained for each application accessed within each window. For example, a history list 408 may be maintained for access to a browser, a chat room, and application tools. Application tools may consist of a number of local applications such as, for example, word processing, graphics programs, and multi-media programs. The local applications are maintained on and processed by client 160. In one embodiment, a separate history list 408 may be maintained for the browser, chat room, and for each of the application programs within the application tools. In one embodiment, an entry for each application accessed under application tools may be entered into a browser bookmark file.

After the user has signed-on to the system, multiple-browser application 402 configures the client 160 based upon information within client configuration 404 in order that the user may access a variety of applications (such as, for example, a browser, chat, and the applications within application tools). As the user navigates within a given application, the pages or windows of the application are displayed within a main content window on the display screen and the content of each page is saved in multiple-browser windows cache 406. In addition, an entry is entered into the appropriate history list 408 for the application. The user may move between the various applications by manipulating or "clicking" navigation buttons on the desktop. Whenever the user navigates back to a previously accessed application, multiple-browser application 402 accesses the history list 408 for the application, retrieves the content for the history list 408 entry from multiple-browser windows cache 406, and displays the content within the content window. Thus, the system provides an integrated, webcentric desktop management system that seamlessly manages the state of each application active within the system and allows the user to move effortlessly from one application to another.

Figure 5:
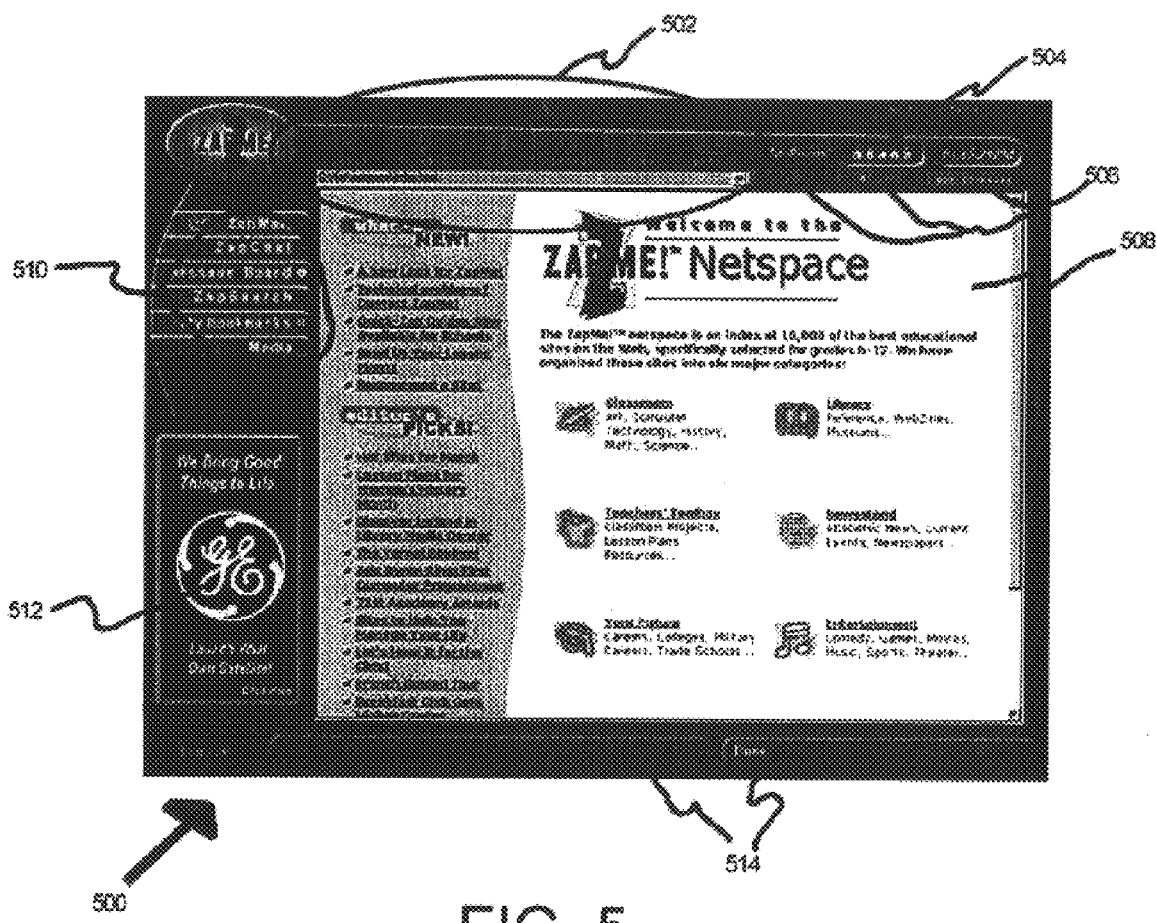
FIG. 5 is a layout of one embodiment for a graphical user interface of a multiple-browser client architecture.

FIG. 5 is a layout of one embodiment for a graphical user interface (GUI) 500 of a multiple-browser client architecture. In one embodiment, GUI 500 is displayed upon client 160 and is configured based on pre-defined user privileges and the terminal privileges. In one embodiment, GUI 500 provides the gateway by which a user accesses both local and remote resources. Thus, the configuration of GUI 500 determines the resources to which the user has access.

In one embodiment, navigation buttons 502 provide graphical "buttons" that allow a user to perform certain operations. Navigation buttons 502 may include, for example, "back," "forward," and "stop" buttons for browser control as well as "save," "open," and "print" buttons for general application control. In alternate embodiments, fewer, and/or different buttons and commands may be included in navigation buttons 502 (e.g. the ability to type in a URL, history navigation button, and bookmark button).

In one embodiment, applications/edit menus 506 provides application selection control and general editing control for multiple applications within content window 508. For example, applications/edit menus 506 may include a list of all local and/or remote applications available to the user of the terminal on which GUI 500 is displayed. For example, from the tools menu, the user may select an application to use. The edit portion provides general editing commands such as "cut," "copy," and "paste" for the user to move data between available applications.

In one embodiment, points meter 504 provides a summary of incentive points or other points schemes available to the user. An incentive points management scheme is described in greater detail in U.S. patent application Ser. No. 09/213,238 entitled "METHOD AND APPARATUS FOR INCENTIVE POINTS MANAGEMENT," which is assigned to the corporate assignee of the present invention.

Content window 508 provides space for the user to interact with the resources accessed. For example, if a word processing application is being accessed, content window 508 displays the word processing application within content window 508 when the application is activated. The user may switch between applications and move data between applications that are available on the terminal using applications/edit menus 506 should the current user have sufficient privileges to do so on the current terminal. If a browser application is being used, content window 508 is used to display a browser window.

In one embodiment, feature and channel buttons 510 provide access to features (e.g., e-mail, chat rooms, message boards, bookmarks) and channels (e.g., educational topics, news topics) available to the user. Feature and channel buttons 510 are configured based on the session privileges such that only the features and channels available to or associated with the user appear. Feature and channel buttons may also control what is displayed in content window 508.

In one embodiment, dynamic billboard 512 provides advertising and/or other information to the user while the user is using an application or browser. One embodiment of an advertising implementation for dynamic billboard 512 is disclosed in U.S. patent application Ser. No. 09/227,476 entitled "MICRO-TARGETED ADVERTISING," which is assigned to the corporate assignee of the present invention. In alternate embodiments, dynamic billboard 512 may be used for other purposes such as, for example, video conferencing, instant messaging, distance learning/instruction, news updates, or other uses.

In one embodiment, messaging windows 514 display messages to the user. For example, an instructor may send messages to students, a user of one terminal may send a message to a user of another terminal, a system administrator may send messages to a user or a group of users, or the system may send a notification that the user has received e-mail. Messaging windows 514 are used for messages that are independent of content window 508, so long as such messages are allowed by the current session privileges.

Figure 6:
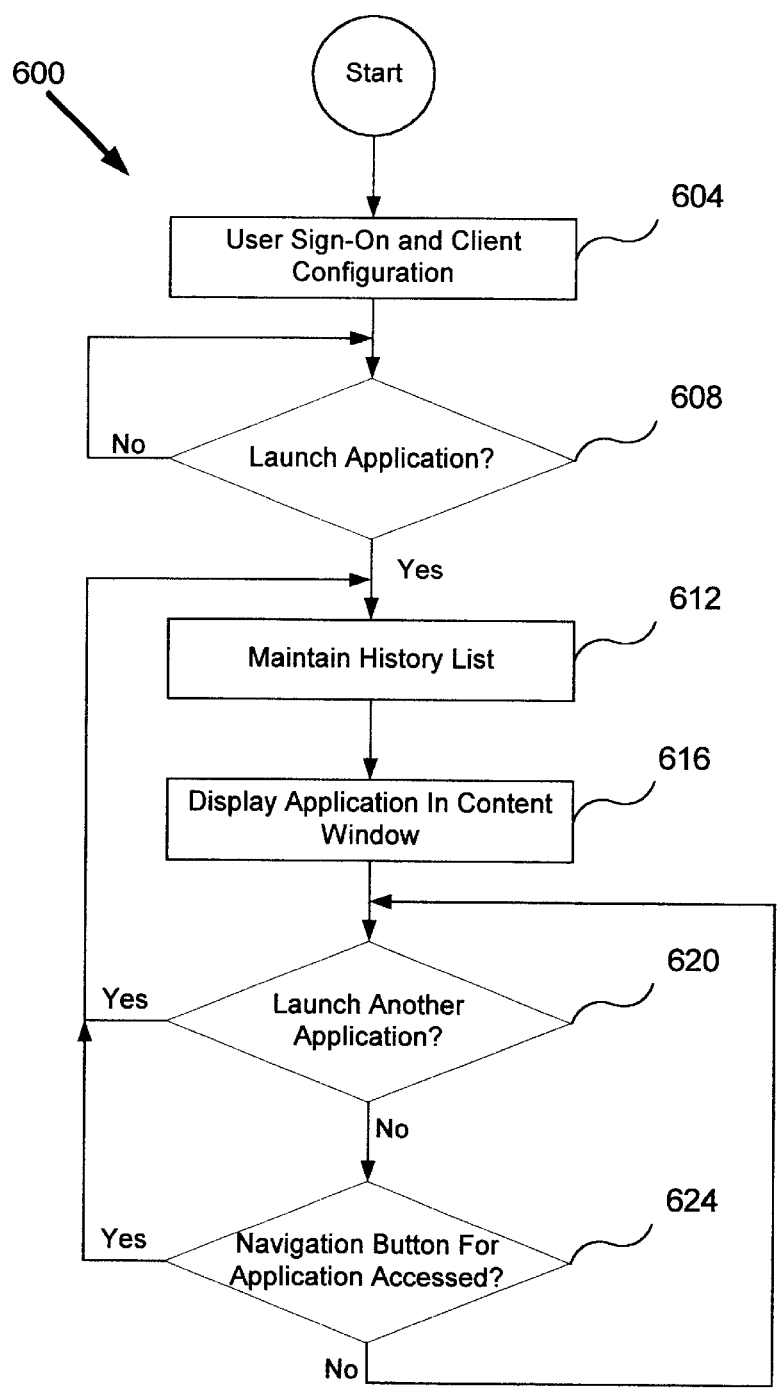
FIG. 6 is a flow diagram of one embodiment for navigating a multiple-browser client architecture.

FIG. 6 is a flow diagram of one embodiment for navigating a multiple-browser client architecture. Initially at processing block 604, a user signs-on to the system. In one embodiment, the user signs on using a user identification and password combination. After the user's sign-on is verified, client 160 is configured for the particular identification/password combination. Configuration settings are maintained in client configuration 404 and allow or deny access to a number of applications maintained on network operations center 150 and/or client 160. In addition, applications may be maintained on a proxy server located within local-area network 120. In one embodiment, applications comprise browser, chat, e-mail, advertisements, network operations center content, and client applications. Client applications are application programs maintained on client 160 such as, for example, word processing, graphics programs, educational programs, and the like.

After the user signs-on and the configuration is set, multiple-browser application 402 waits for user input at processing block 608. If at processing block 608, the user launches an application, processing continues at processing block 612. In one embodiment, the user may launch an application by accessing a feature and channel buttons 510 or navigation button 502 or accessing an application through an application/edit menu 506. At processing block 612, the chosen application is launched and the history list 408 for the application is updated. If the history list 408 for the application does not exist, a new history list is created. At processing block 616, the content page for the application is displayed within content window 508 and the content is cached in multiple-browser windows cache 406. In an alternate embodiment, the content may not be cached until the user navigates to another page of information.

At processing block 620, multiple-browser application 402 determines if another application has been launched. As above, the application may be launched by a variety of methods. If another application has been launched, processing returns to processing block 612. If another application has not been launched, multiple-browser application 402 determines if a navigation button 502 for the particular application has been accessed. If a navigation button 502 has been accessed, processing returns to block 612. If a navigation button 502 has not been accessed, processing returns to block 620.

The user may launch applications by a variety of methods. For example, the user may launch the chat or e-mail applications by clicking on a feature or channel button 510 on the desktop. The user may access a web page for the sponsor of an advertisement by clicking on the advertisement dynamic billboard 512. For example, if the user clicks on the dynamic billboard 512, the browser application is accessed and the web site of the sponsor is displayed within content window 508. In one embodiment, the content is cached in a media window cache within multiple-browser windows cache 406 and a history list 408 entry is made for the window. The invention has been described in conjunction with the preferred embodiment. It is evident that numerous alternatives, modifications, variations and uses will be apparent to those skilled in the art in light of the foregoing description.

What is claimed is:

1. A method of implementing a multiple-browser client architecture having an integrated interface to aggregate functions of multiple applications, the method comprising:
    launching a multiple-browser application within the integrated interface;
    maintaining, in memory, content data of one or more applications launched within the integrated interface, the applications executing separately from the multiple-browser application;
    maintaining in memory a separate history list for each application;
    displaying content data of an application when launched;
    performing an activity in response to selection of a history list entry; and
    using the multiple-browser application to centrally manage and provide access to each application and the separate history list for each application.

2. The method of claim 1 further comprising:
    replacing within a content window content data of a first application with content data of a second application from memory, executing separately from the multiple-browser application and the first application, in response to the second application being launched.

3. The method of claim 1 wherein the history list comprises a plurality of entries, each of the entries indicating the application from which the content data came, a window came which the content data from, and a location of the content data.

4. The method of claim 1 wherein displaying further comprises:
    locating an application; and
    inserting content data corresponding to the application within a content window.

5. The method of claim 1 wherein the application is launched by one of accessing a feature button, accessing a channel button, entering a uniform resource locator, entering an application name accessing a navigation button, clicking on an application window, and accessing an application menu.

6. The method of claim 1 wherein the integrated interface provides operating system functions and application functions.

7. The method of claim 1 wherein the integrated interface provides a dynamic billboard as part of the interface.

8. A system for managing multiple applications, within an integrated interface to aggregate functions of the multiple applications, the system comprising:
    means for maintaining, in memory, content data of the multiple applications launched within the integrated interface, each of the multiple applications executing separately from the other multiple applications;
    means for maintaining in memory a separate history list for each of the multiple applications;
    means for centrally managing the multiple applications and the separate history list for each of the multiple applications;
    means for performing an activity in response to selection of a history list entry; and
    means for providing access to the multiple applications and the separate history list for each of the multiple applications.

9. The system of claim 8 further comprising:
    means for replacing content data of a first application with content data of a second application from memory, executing separately from the multiple-browser application and the first application, in response to the second application being launched.

10. The system of claim 8 wherein the integrated interface provides means for including operating system functions and application functions.

11. The system of claim 8 wherein the integrated interface provides means for using a dynamic billboard as part of the interface.

12. The method of claim 8 wherein the history list comprises a plurality of entries, each of the entries indicating the application from which the content data came, a window from which the content data came, and a location of the content data.

13. The method of claim 8 wherein the application is launched by one of accessing a feature button, accessing a channel button, entering a uniform resource locator, entering an application name accessing a navigation button, clicking on an application window, and accessing an application menu.

14. An article of manufacture comprising a machine-accessible medium including thereon sequences of instructions that when executed cause a machine to:
    maintain, in memory, content data of multiple applications launched within an integrated interface;
    maintain in memory a separate history list for each of the multiple applications;
    centrally manage, via a multiple-browser application, the multiple applications and the separate history list for each of the multiple applications;

perform an activity in response to selection of a history list entry; and provide access, via the multiple-browser application, to the multiple applications and the separate history list for each of the multiple applications.

15. The medium of claim 14 further configured to:

replace content data of a first application with content data of a second application from memory, executing separately from the multiple-browser application and the first application, in response to the second application being launched.

16. The article of manufacture of claim 14 wherein the integrated interface provides operating system functions and application functions.

17. The article of manufacture of claim 14 wherein the integrated interface provides a dynamically updating billboard as part of the interface.

18. The method of claim 14 wherein the history list comprises a plurality of entries, each of the entries indicating the application from which the content data came, a window from which the content data came, and a location of the content data.

19. The method of claim 14 wherein the application is launched by one of accessing a feature button, accessing a channel button, entering a uniform resource locator, entering an application name accessing a navigation button, clicking on an application window, and accessing an application menu.

20. A system for implementing a multiple-browser client architecture, the system comprising:

an integrated interface configured to launch a plurality of applications; and a history list for each application;

a content window to display content data for each application; and a multiple browser application to maintain in memory the content data and history list for each application, centrally manage and provide access to the applications and the history list for each application, perform an activity in response to selection of a history list entry, and replace content data of a first application with content data of a second application from memory in response to the second application being launched.

21. The system of claim 20 wherein the history list comprises a plurality of entries, each of said entries indicating the application the content data came from, a pointer to an application window the content data came from, and a location of the content.

22. The system of claim 20 wherein the application is launched by one of accessing a feature button, accessing a channel button, entering a uniform resource locator, entering an application name accessing a navigation button, clicking on an application window, and accessing an application menu.

23. The system of claim 20 wherein the integrated interface provides operating system functions and application functions.

24. The system of claim 20 wherein the integrated interface provides a dynamically updating billboard as part of the interface.

25. The system of claim 20 wherein displaying further comprises:

locating an application; and inserting content data corresponding to the application within a content window.

26. A computer system comprising:

a bus;

a processor, coupled to the bus; and a memory device, coupled to the bus, comprising an integrated interface configured to launch a plurality of applications, a history list for each application, configured to maintain a plurality of entries, each of the entries indicating the application from which the content data came, an application window from which the content data came, and a location of the content data;

a content window to display content data for each application; and a multiple browser application to maintain in memory the content data and history list for each application, centrally manage and provide access to the application and the history list for each application, perform an activity in response to selection of a history list entry, and replace content data of a first application with content data of a second application from memory in response to the second application being launched.

27. The computer system of claim 26 wherein the history list comprises a plurality of entries, each of the entries indicating the application from which the content data came, a window from which the content data came, and a location of the content data.

28. The computer system of claim 26 wherein the application is launched by one of accessing a feature button, accessing a channel button, entering a uniform resource locator, entering an application name accessing a navigation button, clicking on an application window, and accessing an application menu.

29. The computer system of claim 26 wherein displaying further comprises:

locating an application; and inserting content data corresponding to the application within a content window.

30. The computer system of claim 26 wherein the integrated interface provides operating system functions and application functions.

31. The computer system of claim 26 wherein the integrated interface provides a dynamically updating billboard as part of the interface.

32. A method of managing multiple applications, within an integrated interface that aggregates functions of the multiple applications, the method comprising:

maintaining, in memory, content data of the multiple applications launched within the integrated interface, each of the multiple applications;

maintaining in memory a separate history list for each of the multiple applications;

performing an activity in response to selection of a history list entry;

centrally managing the multiple applications and the separate history list for each of the multiple applications; and providing access to the multiple applications and the separate history list for each of the multiple applications.

33. The method of claim 32 further comprising:

replacing content data of a first application with content data of a second application from memory, executing separately from the multiple-browser application and the first application, in response to the second application being launched.

34. The method of claim 32 wherein the history list comprises a plurality of entries, each of the entries indicating the application from which the content data came, a window from which the content data came, and a location of the content data.

35. The method of claim 32 wherein the application is launched by one of accessing a feature button, accessing a channel button, entering a uniform resource locator, entering an application name accessing a navigation button, clicking on an application window, and accessing an application menu.

* * * * *

UNITED STATES PATENT AND TRADEMARK OFFICE
CERTIFICATE OF CORRECTION

PATENT NO.    : 6,397,264 B1
DATED         : May 28, 2002
INVENTOR(S)   : Steven L. Strasnick et al.

It is certified that error appears in the above-identified patent and that said Letters Patent is hereby corrected as shown below:

Column 12,
Line 18, "application" has been replaced with -- applications --.

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,397,264 B1                                          Page 1 of 1
DATED          : May 28, 2002
INVENTOR(S)    : Steven L. Strasnick et al.

It is certified that error appears in the above-identified patent and that said Letters Patent is hereby corrected as shown below:

<u>Title page,</u>
Item [75], Inventors, "Steven L. Stasnick, Mountain View; David Lundberg, Dublin" has been replaced with -- Steven L. Strasnick, Mountain View; Linda A. Byrne, San Ramon, both of CA (US) --.

Signed and Sealed this

Twenty-second Day of July, 2003

JAMES E. ROGAN
*Director of the United States Patent and Trademark Office*